United States Patent
Kanakubo

(10) Patent No.: US 7,233,462 B2
(45) Date of Patent: Jun. 19, 2007

(54) VOLTAGE REGULATOR HAVING OVERCURRENT PROTECTION CIRCUIT

(75) Inventor: Yoshihide Kanakubo, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/267,773

(22) Filed: Nov. 3, 2005

(65) Prior Publication Data

US 2006/0103992 A1    May 18, 2006

(30) Foreign Application Priority Data

Nov. 15, 2004   (JP)   ............................. 2004-330443

(51) Int. Cl.
*H02H 7/00* (2006.01)

(52) U.S. Cl. ...................... 361/18; 361/93.1; 361/93.9; 361/93.7; 323/282

(58) Field of Classification Search .............. 361/93.9, 361/93.1, 93.7, 18; 323/274, 282, 280
See application file for complete search history.

(56) References Cited

U.S. PATENT DOCUMENTS 6,801,419 B2 * 10/2004 Fukui ........................ 361/93.1
6,922,321 B2 * 7/2005 Katoh et al. ................ 361/93.9
6,977,491 B1 * 12/2005 Caldwell et al. ............ 323/282
7,019,584 B2 * 3/2006 Bartel et al. ................ 327/539
2005/0035749 A1 * 2/2005 Bo et al. ..................... 323/315

* cited by examiner

*Primary Examiner*—Stephen W. Jackson
*Assistant Examiner*—Terrence Willoughby
(74) *Attorney, Agent, or Firm*—Adams & Wilks

(57) ABSTRACT

An overcurrent protection circuit for a voltage regulator has a first transistor having a gate for connection to a gate of an output transistor of the voltage regulator, a resistor connected to a drain of the first transistor, an output voltage detecting transistor having a gate connected to an output terminal of a dividing resistance circuit of the voltage regulator, and a current mirror circuit having an input terminal connected to the drain of the output voltage detecting transistor. A second transistor has a gate connected to the drain of the first transistor and a drain connected to an output terminal of the current mirror circuit. A third transistor has a gate connected to the output terminal of the current mirror circuit and a drain for connection to the gate of the output transistor of the voltage regulator.

6 Claims, 2 Drawing Sheets

VOLTAGE REGULATOR HAVING OVERCURRENT PROTECTION CIRCUIT

BACKGROUND OF THE INVENTION

1. Field of the Invention

The present invention relates to a voltage regulator including an overcurrent protection circuit.

2. Description of the Related Art

FIG. 3 is a circuit diagram of a drooping type overcurrent protection circuit in a conventional voltage regulator. The overcurrent protection circuit generates such a short circuit current as shown in FIG. 4 when short circuit occurs at its output terminal, and is therefore called a drooping type overcurrent protection circuit.

The circuit is composed of: an error amplifier 11 for amplifying a difference voltage between a reference voltage of a reference voltage circuit 10 and a voltage Va at a node or dividing point A of bleeder resistors 13 and 14 for dividing a voltage Vout of the voltage regulator; and an output transistor 12. When an output voltage of the error amplifier 11 is Verr, an output voltage of the reference voltage circuit 10 is Vref, and Vref≦Va, then Verr decreases. When Vref≦Va, Verr increases.

When Verr decreases, at the output transistor 12 which is a P-ch MOS transistor in this case, a gate-source voltage increases and ON resistance decreases. Thus, an output voltage Vout increases. When Verr increases, the ON resistance of the output transistor 12 increases and the output voltage decreases, thereby keeping the output voltage Vout constant. When a load resistance 20 decreases and an output current increases, the gate-source voltage of the output transistor 12 increases. A current flowing into a transistor 15 having a gate voltage common with the output transistor 12 also increases. With the larger current flowing into the transistor 15, a current flowing into a resistor 16 increases. When the current is equal to or larger than the predetermined value, the voltage increase by the resistor 16 exceeds a threshold value of a transistor 17. The transistor 17 is turned ON and a current flows into a resistor 18. Then a transistor 19 is turned ON, the gate voltage of the output transistor 12 increases, and the output voltage decreases, whereby overcurrent protection operates.

With respect to the drooping type overcurrent protection circuit in the conventional voltage regulator, irrespective of the output voltage, the current generated upon overcurrent protecting operation is constant. The output voltage is controlled to be low, but the output current is kept high and a load imposed on the circuit is kept large (see JP 2003-029856 A (page 6, FIG. 3)).

SUMMARY OF THE INVENTION

To solve the conventional problem, it is therefore an object of the present invention to obtain an overcurrent protection circuit capable of controlling a short circuit current generated upon overcurrent protecting operation by adding a simple circuit to a conventional drooping type overcurrent protection circuit.

A voltage regulator according to the present invention is structured to vary a value of a short circuit current generated upon overcurrent protecting operation by controlling a gate voltage of an output transistor in accordance with a value of an output voltage.

According to the present invention, only by adding a simple circuit to a conventional drooping type overcurrent protection circuit, it is possible to obtain an overcurrent protection circuit capable of controlling a short circuit current generated upon overcurrent protecting operation to be low.

DETAILED DESCRIPTION OF THE PREFERRED EMBODIMENT

Embodiment

Figure 1:
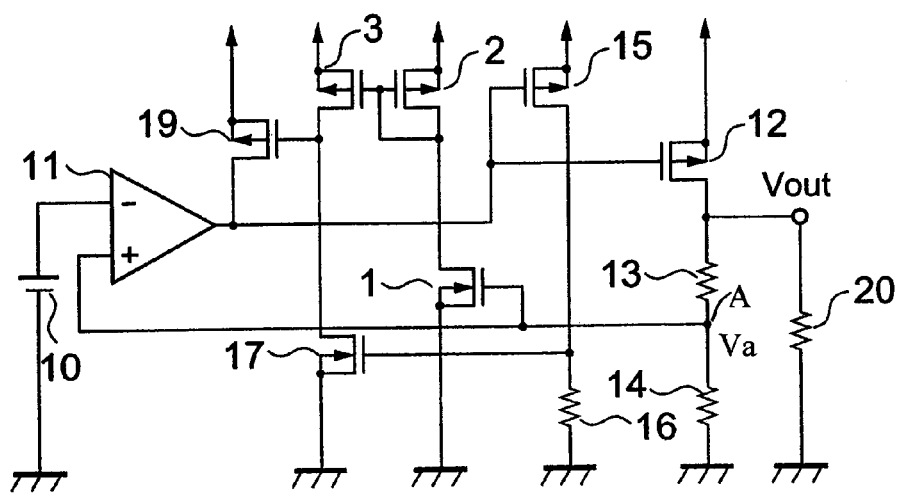
FIG. 1 is a circuit diagram of a voltage regulator according to the present invention.

FIG. 1 is a circuit diagram of a voltage regulator according to the present invention. The voltage regulator includes a reference voltage circuit 10, bleeder resistors 13 and 14 as a dividing resistance circuit, an output transistor 12, a load resistance 20, a transistor 15 (first transistor) for a drooping type overcurrent protection circuit, a transistor 17 (second transistor), a transistor 19 (third transistor), and a resistor 16, which are the same as those in the conventional voltage regulator.

A difference from the conventional drooping type overcurrent protection circuit is a structure comprising a transistor 1 (output voltage detecting transistor) using a voltage dividing point A of a the divided resistance circuit 13, 14 for a gate voltage; a transistor 2 having a gate connected to a drain side of the transistor 1 and a drain which is common with the gate; and a transistor 3 commonly connected to the gate of the transistor 2. A drain side of the transistor 3 is connected to a drain of the transistor 17 and a gate of the transistor 19. The transistors 2 and 3 form a current mirror circuit.

Referring to the circuit of FIG. 1, operation of the present invention is described.

First, when an output voltage is normal, the dividing point A of the bleeder resistors 13, 14 has a voltage higher than a threshold voltage of the transistor 1 and the transistor 1 is ON. Then a current flowing through the transistor 1 puts a current value into the transistor 3 via the transistor 2. Therefore, when the transistor 1 is ON while detecting a high output voltage, the transistor 3 is turned ON to control a resistance value to be small.

Next, when a short circuit occurs at an output terminal for some reason, a voltage at the output terminal decreases and its output current increases. Thus, a current flowing into the transistor 15 also increases. When the voltage increase by the resistor 16 exceeds a threshold value of the transistor 17, the transistor 17 is turned ON. When a current generated upon turning ON of the transistor 17 exceeds a current flowing into the transistor 3, a gate voltage of the transistor 19 decreases and therefore a gate voltage of the output transistor 12 increases, whereby the overcurrent protection circuit functions to limit the output current.

Figure 2:
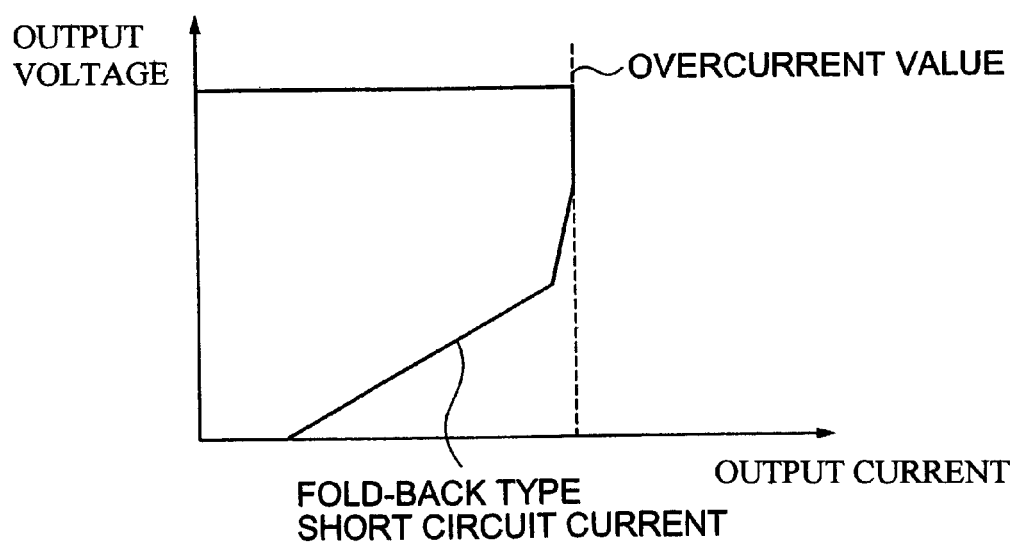
FIG. 2 is a graphical representation explaining overcurrent protection characteristics in the voltage regulator according to the present invention.
Figure 3:
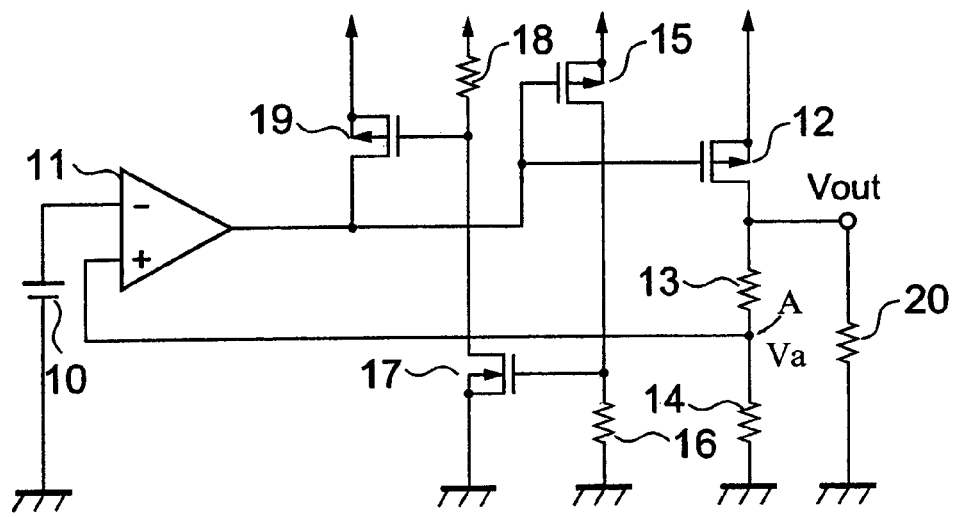
FIG. 3 is a circuit diagram of a conventional voltage regulator.
Figure 4:
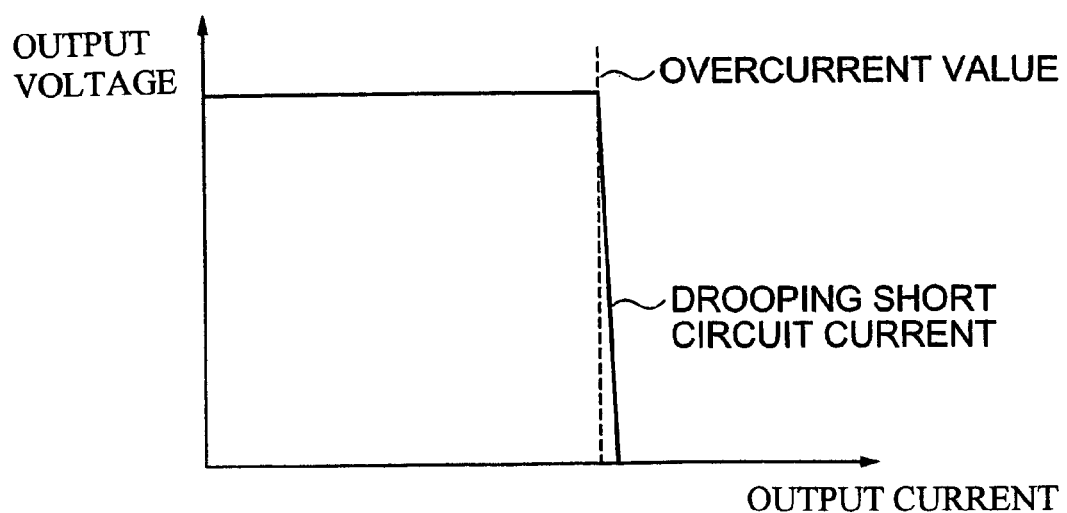
FIG. 4 is a graphical representation explaining overcurrent protection characteristics in the conventional voltage regulator.

At this time, with the decrease of the output voltage under the overcurrent protecting operation, the gate voltage of the transistor 1 decreases and a value of the current flowing into the transistor 2 is suppressed. Thus, overcurrent protection works at least on a value of the current flowing into the transistor 17. Further, because the transistor 3 functions in an equivalent manner to a variable transistor, the short circuit current is controlled to be lower as the output voltage becomes lower as shown in the overcurrent protection characteristics of FIG. 2.

Also, in this embodiment, the dividing point of the bleeder resistors and an input of an error amplifier have a common potential, but they do not necessarily need to have a common potential. It is obvious that no problems occur when a still lower voltage is input to the transistor gate than that to the dividing point of the bleeder resistors.

Also, the bleeder resistors are used for the circuit for monitoring the output voltage value, but equivalent characteristics can be obtained by separately providing a resistor or the like for the monitoring.

Further, by structuring the transistor 1 with a depletion type transistor, the output voltage can be controlled to be a still lower voltage.

What is claimed is:

1. A voltage regulator, comprising:
    a dividing resistance circuit for dividing an output voltage of the voltage regulator;
    a reference voltage circuit;
    an error amplifier for comparing a voltage of the dividing resistance circuit with a voltage of the reference voltage circuit;
    an output transistor for controlling the output voltage of the voltage regulator while receiving an output of the error amplifier; and
    an overcurrent protection circuit comprising a first transistor having a gate connected to a gate of the output transistor, a resistor connected to a drain of the first transistor, an output voltage detecting transistor having a gate connected to an output terminal of the dividing resistance circuit, a current mirror circuit having an input terminal connected to the drain of the output voltage detecting transistor, a second transistor having a gate connected to the drain of the first transistor and a drain connected to an output terminal of the current mirror circuit, and a third transistor having a gate connected to the output terminal of the current mirror circuit and a drain connected to the gate of the output transistor.

2. A voltage regulator according to claim 1; wherein the output voltage detecting transistor comprises a depletion type output voltage detecting transistor.

3. A voltage regulator according to claim 1; wherein the overcurrent protection circuit controls an output current of the voltage regulator in accordance with the output voltage of the voltage regulator.

4. An overcurrent protection circuit for a voltage regulator, comprising: a first transistor having a gate for connection to a gate of an output transistor of the voltage regulator; a resistor connected to a drain of the first transistor; an output voltage detecting transistor having a gate connected to an output terminal of a dividing resistance circuit of the voltage regulator; a current mirror circuit having an input terminal connected to the drain of the output voltage detecting transistor; a second transistor having a gate connected to the drain of the first transistor and a drain connected to an output terminal of the current mirror circuit; and a third transistor having a gate connected to the output terminal of the current mirror circuit and a drain for connection to the gate of the output transistor of the voltage regulator.

5. An overcurrent protection circuit according to claim 4; wherein the overcurrent protection circuit is configured to control an output current of the voltage regulator in accordance with an output voltage of the voltage regulator.

6. An overcurrent protection circuit according to claim 4; wherein the output voltage detecting transistor comprises a depletion type output voltage detecting transistor.

* * * * *